April 5, 1927.
J. GIARDINO
1,623,105
TENSION DEVICE FOR THE HARNESS OF LOOMS
Filed April 21 1926
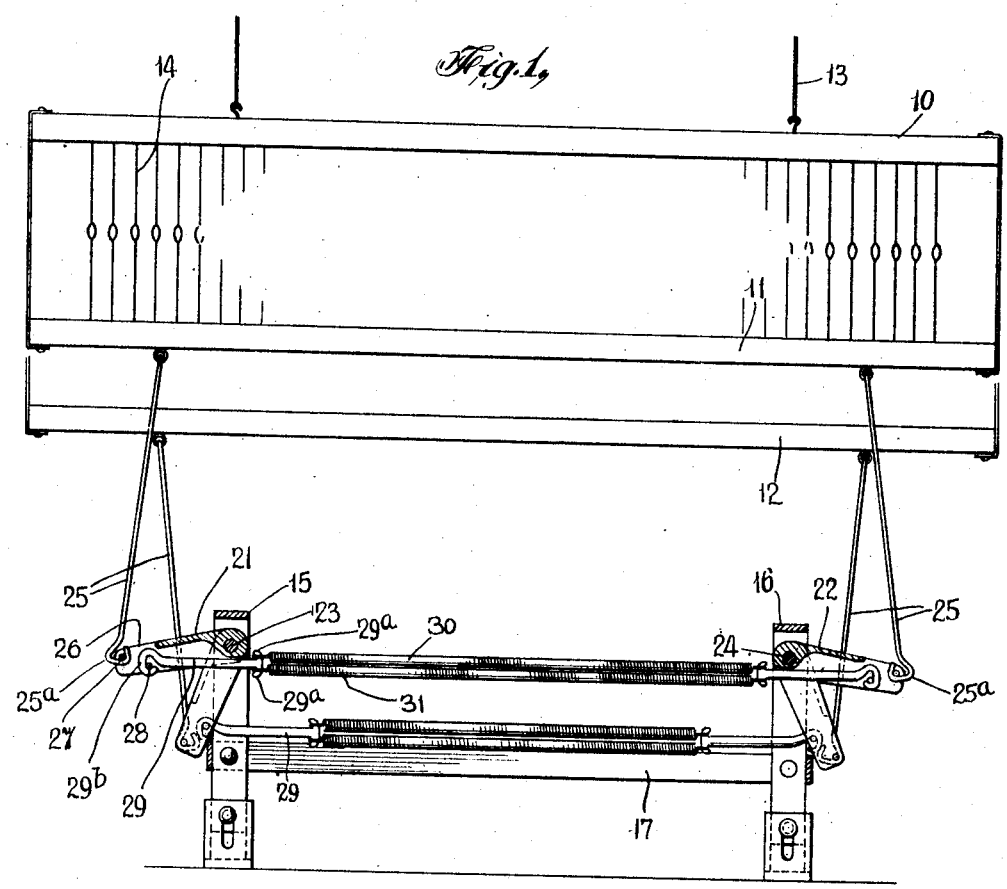
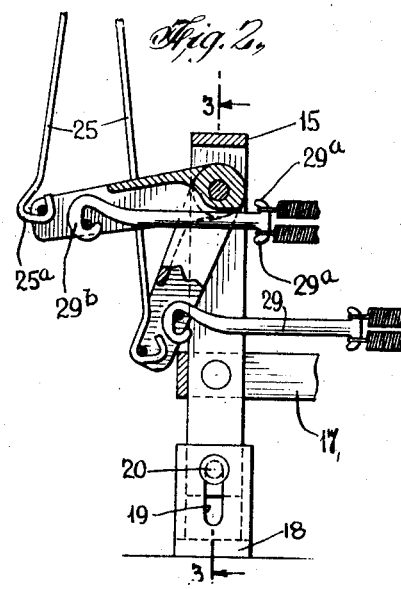
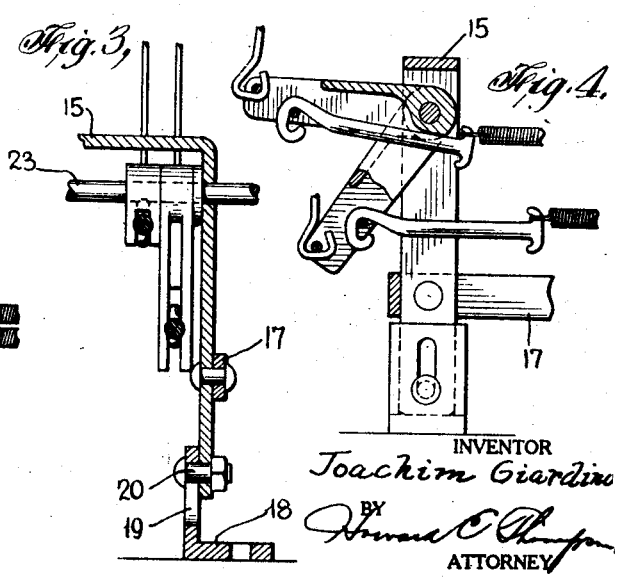
INVENTOR
Joachim Giardino
BY
ATTORNEY Patented Apr. 5, 1927.

1,623,105

UNITED STATES PATENT OFFICE.

JOACHIM GIARDINO, OF WEST NEW YORK, NEW JERSEY.

TENSION DEVICE FOR THE HARNESS OF LOOMS.

Application filed April 21, 1926. Serial No. 103,479.

This invention relates to looms and particularly to the provision of tensional devices for controlling what is known as the harness of looms or the separate shafts of the harness; and the object of the invention is to provide a tension device which will effect a proper downward pull of the separate shafts of the harness in the weaving operation and produce a balanced tensional action at the opposed ends of the separate shafts, thus maintaining the shafts in proper relation and position at all times, and especially in machines employing what is known as semi-positive dobby control to the separate shafts, it being understood that the shafts are normally held downwardly by the tensional devices and moved upwardly against said tensional devices by the action of the dobbies; a further object being to provide a tensional control device for the shafts of the harness which is so constructed that in the upward pull of said shafts, no appreciable increase in the spring tension is experienced, and to the contrary, a greater leverage is provided for the spring expansion, thus producing a more or less balanced effect or equal spring tension in the several positions assumed by the shafts of the harness in the operation thereof, and it will be apparent that a comparatively heavy spring tension or load is provided when the frames are in their lowered position, which is especially desirable and practical on heavy weaves; a still further object being to provide a tension device in the form of a frame supported beneath the harness of the loom and comprising opposed levers with which links are coupled, and means on said links for coupling one or more springs with opposed links in said frame; a further object being to provide means for adjustably supporting the frame to increase or decrease the distance between the pivot points of the levers of said frame and the respective shafts of the harness to control and regulate the tension of said tensional devices; and with these and other objects in view, the invention consists in an apparatus of the class and for the purpose specified, which is simple in construction and operation, efficient in use, and which is constructed as hereinafter described and claimed.

The invention is fully disclosed in the following specification, of which the accompanying drawing forms a part, in which the separate parts of my improvement are designated by suitable reference characters in each of the views, and in which:—

Fig. 1 is a diagrammatic view illustrating two frames of a harness with my improved tension device in operative connection therewith.

Fig. 2 is a view similar to Fig. 1 but showing only a part of the construction and on an enlarged scale.

Fig. 3 is a partial section on the line 3—3 of Fig. 2; and,

Fig. 4 is a view similar to Fig. 2 but showing the parts in an adjusted position.

In the drawing, I have represented at 10 the harness of a loom, or two of the shafts or frames 11 and 12 of the harness which are coupled with and operated by the dobby of the machine through cords or links 13 and part of the heddles of the shafts or frames 11 and 12 being indicated at 14.

In practice, I provide a frame consisting of spaced U-shaped frame members 15 and 16 of similar construction and coupled together by a horizontal rectangular frame 17 which is riveted, bolted or otherwise secured to the frame members 15 and 16 adjacent the lower end portions thereof. The lower ends of the U-shaped frame members 15 and 16 are coupled with foot members in in the form of angle iron plates 18, each having elongated apertures 19 in the upright portions thereof, through which bolts 20 mounted on the lower ends of the frames 15 and 16 are free to pass whereby the frames 15 and 16 may be adjustably supported in the foot members 18.

It will be understood that the distance between the sides of the frame members 15 and 16 will be such as to receive a sufficient number of levers 21—22 in the respective frames to compensate for the number of shafts or frames 11 and 12 employed in the harness. For the purpose of illustration only two shafts 11 and 12 are shown and two sets of levers 21—22. The levers 21 and 22 are mounted on rods or shafts 23 and 24 supported in the frames 15 and 16 respectively adjacent the upper ends thereof and extending from one side member to the other side member thereof. The levers 21 are all of the same form and construction and consist of channel-shaped arms, to the outer end portions of which are pivoted connecting rods 25 which extend upwardly and are coupled with the lower ends of the respective shafts 11 and 12 adjacent the end portions thereof as clearly seen in Fig. 1 of the drawing. The connecting rods 25 pass through apertures 26 formed in the outer ends of the channeled arms, and the coupling of said rods with the levers 21 and 22 being by pins 27 passed therethrough.

Other pins 28 are mounted in the levers 21 and 22 inwardly of the pins 27 and coupled therewith are links 29, the inner ends of which are T-shaped in form and provided with laterally extending keepers 29$^a$ to receive the ends of coil springs 30 and 31 as clearly seen in Fig. 1 of the drawing. It will be noted that the ends of the rods 25 where they couple with the levers 21—22 have comparatively wide harness members to permit of relative movement of the pins 27 within said hook members in the movement of the levers from one position to another as indicated in Fig. 1 of the drawing.

The links 29 are also provided with hook ends 29$^b$ engaging the pins 28 for a similar purpose. It will be noted that the links 29 extend into and operate within the channeled portion of the levers 21—22, especially when the levers are in raised position as seen at the upper part of the frame member 15 in Fig. 1 of the drawing.

It will be noted on a consideration of Fig. 3 of the drawing, that the levers 21—22 in the respective frames 15—16 are arranged side by side upon the rods or shafts 23—24, thus taking up but very little space, whereby the said levers may be positioned directly beneath the respective shafts or frames 11 and 12 of the harness.

In Figs. 1 and 2 of the drawing, I have shown one of the shafts, the shaft 11, in a raised position, and the rods, levers, links and springs in a corresponding position, while the other shaft 12 is in its lowered position, and the rods, levers, links and springs therefor in a corresponding position. It will be understood, however, that the relative positions of the respective shafts and the tensional control devices therefor may be varied throughout the entire apparatus. In the movement of the shafts from their lowermost position to the uppermost positions thereof, it will be apparent that the tension of the springs 30—31 are slightly increased, but at the same time the leverage for expanding the springs is increased, thus producing a more or less balanced effect. When the levers 21 and 22 are in their extreme uppermost position, the springs are pulled against the pivots 23 and 24 of said levers, thus taking up a material amount of the pressure or spring tension, and this more or less balanced effect or reduction in the spring tension in the upward movement of the shafts 11 and 12 by the dobby operation avoids the objectionable features to an apparatus of this class employing straight coil springs, the tensions of which are increased gradually and continually in the upward movement of said shafts. Further, it will be apparent that by coupling one or more springs 30 and 31 with each set of opposed levers 21 and 22 through the links 29, an equal spring tension is applied to both levers 21 and 22, and this equal pressure or tension is given to the opposite ends of the respective shafts 11 and 12, maintaining the same in proper relation, at all times.

When it is desired to increase the tension of given springs employed, the frame members 15 and 16 may be lowered as indicated in Fig. 4 of the drawing. In this operation, it will also be apparent that with a given dobby action or given movement of the shafts 11 and 12, the levers 21 and 22 will be swung higher than in the construction shown in Figs. 1 and 2 of the drawing, and this change in operation is clearly illustrated in Fig. 4. In this position of the parts, it will be apparent that the release of the tension of the springs is increased when the levers are in their uppermost position in that a substantially direct pull upon the pivots 23 and 24 of said levers takes place. This is also quite apparent on a consideration of Fig. 4 of the drawing.

It will be understood that I am not necessarily limited to the specific form, construction and arrangement of the levers, rods, links and springs herein shown and described nor the manner of their mounting, and various other changes in and modifications of the construction herein set out may be made within the scope of the appended claims without departing from the spirit of my invention or sacrificing its advantages.

Having fully described my invention, what I claim as new and desire to secure by Letters Patent, is:—

1. A tension device for the harness shafts of looms comprising a coil spring, means interposed between the ends of the spring and adjacent end portions of a shaft of the harness for applying tension to said shaft, said means involving pivoted levers arranged in spaced and opposed relation, said levers being of channel formation in cross section, the side walls of the channel projecting at the outer ends of the lever, pins mounted in and traversing the space between said side walls, and connecting rods mounted on the outermost pins of said levers coupled with said shaft.

2. A tension device for the harness shafts of looms comprising a coil spring, means interposed between the ends of the spring and adjacent end portions of a shaft of the harness for applying tension to said shaft, said means involving pivoted levers arranged in spaced and opposed relation, said levers being of channel formation in cross section, the side walls of the channel projecting at the outer ends of the lever, pins mounted in and traversing the space between said side walls, connecting rods mounted on the outermost pins of said levers coupled with said shaft, and links mounted on the other pins of said levers and with which said spring is coupled.

3. A tension device for the harness shafts of looms comprising a coil spring, means interposed between the ends of the spring and adjacent end portions of a shaft of the harness for applying tension to said shaft, said means involving pivoted levers arranged in spaced and opposed relation, said levers being of channel formation in cross section, the side walls of the channel projecting at the outer ends of the lever, pins mounted in and traversing the space between said side walls, connecting rods mounted on the outermost pins of said levers coupled with said shaft, links mounted on the other pins of said levers and with which said spring is coupled, and the ends of the rods and links coupled with said pins having comparatively wide loops in which the pins are movable in the operation of said levers.

4. A tension device for apparatus of the class described comprising a frame having frame members arranged in spaced relation, levers pivotally mounted in the separate frame members and arranged in common opposed alinement, each of said levers being of channel formation in cross section and having flat outer surfaces whereby the levers may be arranged in abutting relation in the separate frame members, the channels of the levers being directed downwardly and the side walls of the levers extending at the outer ends thereof, two pivot pins mounted in said side walls and traversing the space therein, connecting rods mounted within said side walls and coupled with one of the pins of each lever and extending outwardly and upwardly with relation to said levers, links mounted on the other pins of said levers and extending through the channels thereof, and springs coupled with the inner adjacent ends of said links on the links of opposed levers and traversing the space between said frame members.

5. A tension device for apparatus of the class described comprising a frame having frame members arranged in spaced relation, levers pivotally mounted in the separate frame members and arranged in common opposed alinement, each of said levers being of channel formation in cross section and having flat outer surfaces whereby the levers may be arranged in abutting relation in the separate frame members, the channels of the levers being directed downwardly and the side walls of the levers extending at the outer ends thereof, two pivot pins mounted in said side walls and traversing the space therein, connecting rods mounted with said side walls and coupled with one of the pins of each lever and extending outwardly and upwardly with relation to said levers, links mounted on the other pins of said levers and extending through the channels thereof, and springs coupled with the inner adjacent ends of said links on the links of opposed levers and traversing the space between said frame members, the ends of said rods and links coupled with said pivot pins having wide loop portions to permit of the free movement of said pins in said loop portions.

6. A tension device for apparatus of the class described comprising a frame having frame members arranged in spaced relation, levers pivotally mounted in the separate frame members and arranged in common opposed alinement, each of said levers being of channel formation in cross section and having flat outer surfaces whereby the levers may be arranged in abutting relation in the separate frame members, the channels of the levers being directed downwardly and the side walls of the levers extending at the outer ends thereof, two pivot pins mounted in said side walls and traversing the space therein, connecting rods mounted within said side walls and coupled with one of the pins of each lever and extending outwardly and upwardly with relation to said levers, links mounted on the other pins of said levers and extending through the channels thereof, springs coupled with the inner adjacent ends of said links on the links of opposed levers and traversing the space between said frame members, the ends of said rods and links coupled with said pivot pins having wide loop portions to permit of the free movement of said pins in said loop portions, and means for vertically adjusting the frame members to increase or decrease the tension of said springs.

In testimony that I claim the foregoing as my invention I have signed my name this 17th day of April, 1926.

JOACHIM GIARDINO.